(12) United States Patent
Smit (10) Patent No.: US 6,798,089 B1
(45) Date of Patent: Sep. 28, 2004

(54) FORCER AND ASSOCIATED THREE PHASE LINEAR MOTOR SYSTEM

(75) Inventor: Peter Smit, Mount Sinai, NY (US)

(73) Assignee: Anorad Corporation, Shirley, NY (US)

( * ) Notice: Subject to any disclaimer, the term of this patent is extended or adjusted under 35 U.S.C. 154(b) by 0 days.

(21) Appl. No.: 10/367,399

(22) Filed: Feb. 14, 2003

Related U.S. Application Data (63) Continuation of application No. 09/899,671, filed on Jul. 5, 2001, now Pat. No. 6,522,035.

(51) Int. Cl.[7] .............................................. H02K 41/02
(52) U.S. Cl. ....................................................... 310/12
(58) Field of Search .............................. 310/12, 13, 14; 355/53, 72

(56) References Cited

U.S. PATENT DOCUMENTS

| | | | | |
|---|---|---|---|---|
| RE27,289 E | * | 2/1972 | Sawyer ........................ 318/38 |
| 3,707,924 A | * | 1/1973 | Barthalon et al. .......... 104/290 |
| 4,286,180 A | * | 8/1981 | Langley ........................ 310/12 |
| 4,383,192 A | * | 5/1983 | Sikorra ................... 310/154.11 |
| 6,522,035 B1 | * | 2/2003 | Smit ............................ 310/12 |

* cited by examiner

Primary Examiner—Thanh Lam
Assistant Examiner—Judson H. Jones
(74) Attorney, Agent, or Firm—Amin & Turocy, LLP; John M. Miller (57) ABSTRACT

A three phase linear motor system includes a forcer having three pole pairs, which are moveable relative to a platen. The pole pairs are arranged to oppose associated teeth of the platen. The platen teeth are spaced apart from each other in a travel direction according to a predefined tooth pitch. Each of the pole pairs includes a set of teeth that extend from magnetically coupled poles toward the platen. The set of teeth of one of the pole pairs is spaced from the sets of teeth for the other two poles by distances functionally related to about 120 degrees and 240 degrees, respectively, of the tooth pitch.

19 Claims, 7 Drawing Sheets

FORCER AND ASSOCIATED THREE PHASE LINEAR MOTOR SYSTEM

CROSS-REFERENCE TO RELATED APPLICATIONS

This application is a continuation of U.S. Pat. No. 6,522,035 issued on Feb. 18, 2003 based on application Ser. No. 09/899,671, filed on Jul. 5, 2001.

TECHNICAL FIELD

The present invention relates to motors and, more particularly, to a forcer configuration for a linear motor and to a corresponding three phase linear motor system.

BACKGROUND OF THE INVENTION

There are various configurations of linear motors, including generally flat motors, U-channel and tubular shaped motors. Different types of linear motors also are available, including brush, AC brushless, stepper, and induction motors. Common to most linear motors are a moving assembly, usually called a forcer, which moves relative to a stationary platen according to magnetic fields generated by application of current through one or more associated windings. The windings can be on the forcer or at the platen depending on the type of motor.

For example, in a permanent magnet linear motor, a series of armature windings are mounted within a stage that is movable relative to a stationary base plate or platen. The platen typically includes an array of permanent magnets configured to interact with the coils in the stage when energized with an excitation current. Alternatively, the magnets can be located in the stage with the coils situated in the platen. A closed loop servo positioning system is employed to control current through the windings. For example, current is commutated through coils of the stage with a three phase sinusoidal or trapezoidal signal in a closed loop feedback system. When such a linear motor is used in a positioning system, the relationship between the location of the stage and locations of the coils is utilized to control its operation. In such a linear motor, the available magnetic field intensity and thus the force is limited by the field strength of available motor magnets.

A linear stepper motor includes a forcer having windings that are inserted into a laminated core assembly. The stepper also includes a stationary platen having a plurality of teeth spaced apart from each other in a direction of movement. The forcer moves by application of power to a winding, which generates force by causing teeth of the forcer to align with teeth of the platen. The change in current through the windings causes the teeth to consecutively align and, thus, create linear motion. Because the forcer moves a predetermined amount based on the number current pulses, a stepper motor can function as an open loop system that does not require servo tuning. The number of pulses to create motion, which varies based on the tooth pitch on the platen, determines the resolution of the movement. In order to provide desired resolution and stiffness in a linear stepper motor, for example, platen tooth pitch of about 1 mm or less is required, which typically is formed by photochemical etching.

Linear motors are increasingly being employed in manufacturing equipment. In such equipment, nominal increases in the speed of operation translate into significant savings in the cost of production. However, the cost of such equipment often plays a decisive role in determining which type of system will be employed.

SUMMARY

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

One aspect of the present invention provides a forcer for a three phase linear motor system. The forcer includes three pole pairs, each having at least two poles that are magnetically coupled together as part of an associated phase of the motor system. Each phase includes a coil operatively associated with one or more of the poles, which coil can be energized to provide an electromagnetic field at the respective pole pair. Each pole also includes a set of teeth, where each set of teeth for the respective pole pairs are offset from each other to facilitate operation of the three phase linear motor system.

In accordance with a particular aspect, a first set of teeth for one pole pair is offset +/−120 degrees plus M*180 degrees and +/−240 degrees plus N*180 degrees, respectively, of a tooth pitch relative to the other sets of teeth for the other two pole pairs, where M and N are natural numbers.

Another aspect of the present invention provides a three phase linear motor system. The motor system includes a forcer that is moveable relative to a platen. The forcer includes three pole pairs, each pole pair having windings to define an associated phase of the motor system. The pole pairs are arranged to oppose associated teeth of the platen, which platen teeth provide a return path for magnetic flux from the pole pairs. The platen teeth are spaced apart from each other in a direction of movement according to a predefined tooth pitch. Each of the pole pairs also includes a set of teeth, with the set of teeth of the second pole pair being offset from the set teeth of the first pole pair by about +/−120 degrees of the tooth pitch. The set of teeth of the third pole pair are offset from the set of teeth of the first pole pair by a multiple of about −/−240 degrees of the tooth pitch.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

The present invention provides a three phase linear motor. The motor includes three pole pairs, each having associated windings to define an associated phase. The pole pairs are configured to provide forcer movement relative to an associated platen. The platen teeth are spaced apart from each other in the direction of movement according to a predefined tooth pitch. Each of the pole pairs includes a set of teeth. The set of teeth of one of the pole pairs is offset about +/−120 degrees and +/−240 degrees of the tooth pitch relative to the other respective sets of teeth for the other two pole pairs.

Figure 1:
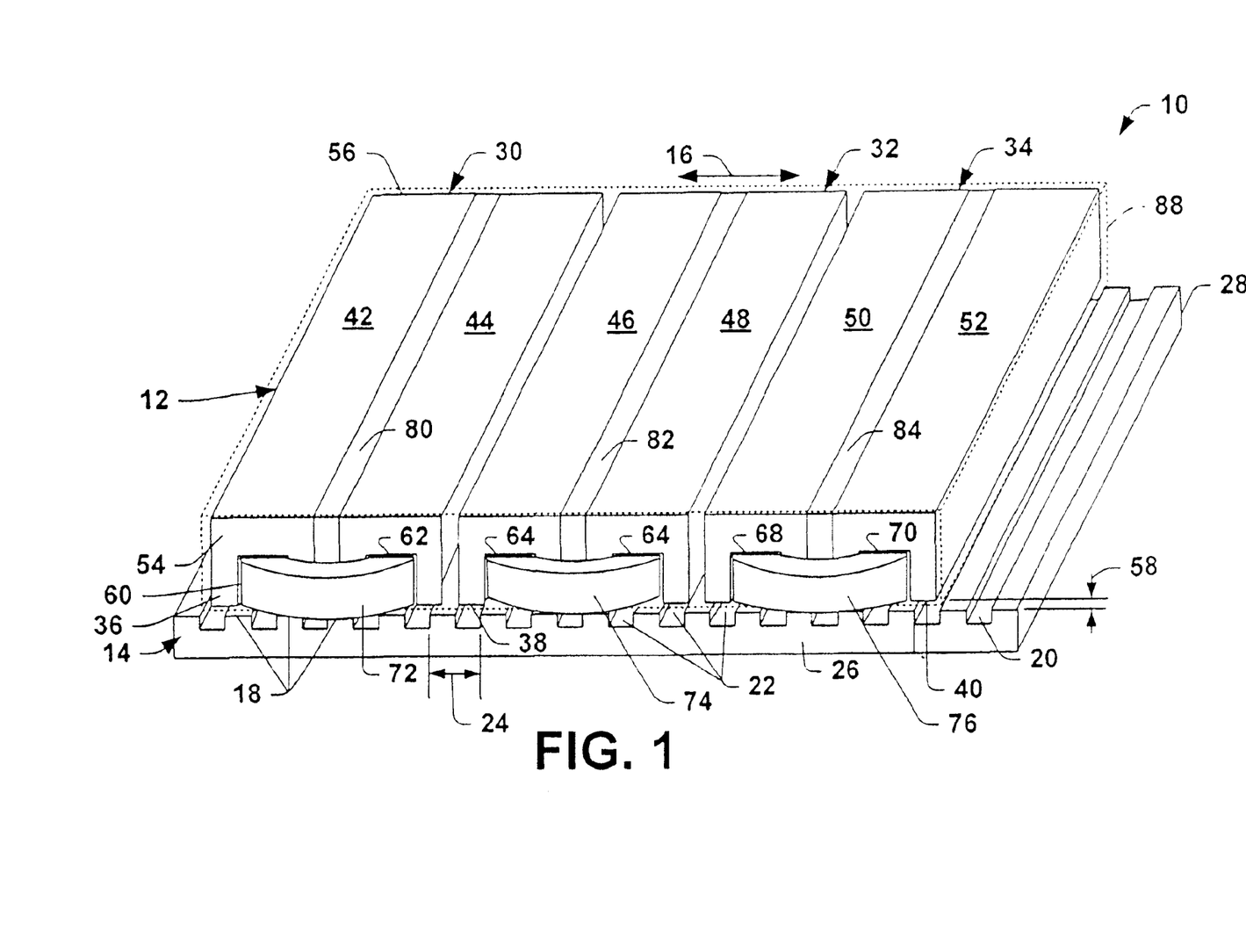
FIG. 1 is an isometric view of a linear motor assembly in accordance with the present invention.

FIG. 1 illustrates an isometric view of a three phase linear motor system 10 in accordance with an aspect of the present invention. The motor 10 includes a forcer 12 that is oriented in a spaced apart relationship relative to a platen 14, which defines the path along which the forcer can traverse in a direction, indicated by arrow 16. It is to be appreciated that the platen 14 could be configured to have substantially any length and any of a variety of desired configurations (e.g., a straight path, a curved path, closed loop path, etc.). It is also to be appreciated that the forcer 12 is supported relative to the platen 14 for movement in the direction 16, such as by low or no friction bearings (e.g., air bearings, not shown).

In the example of FIG. 1, the portion of the illustrated platen 14 includes a plurality of teeth 18 that extend substantially parallel from a planar surface 20 of the platen. The teeth I 8 are spaced apart from each other by respective valleys 22 to provide a predefined tooth pitch, indicated at 24. Each of the teeth 18 extends longitudinally between side edges 26 and 28 of the platen 14. For example, each tooth 18 has width that approximates the width of the associated valley (e.g., tooth width ≈½ tooth pitch). It is to be appreciated that the tooth width also could be slightly less than ½ the tooth pitch 24, with the valleys being slightly greater than ½ the tooth pitch so as to mitigate cogging.

In accordance with an aspect of the present invention, the platen teeth 18 are formed of non-permanent magnetic material (e.g., iron or an alloy thereof) having a sufficient magnetic permeability so that the teeth are magnetizable in response to magnetic fields from the forcer 12, such that the platen provides a return path for flux generated at the forcer. That is, no permanent magnets are required to be disposed on the platen 14 for interaction when the forcer is energized. Accordingly, manufacturing costs associated with the linear motor system 10 can be significantly reduced.

The forcer 12 includes three pole pairs 30, 32, and 34, each having at least four associated teeth 36, 38, and 40, respectively, which teeth are 180 degrees out of phase with each other in each pole pair. The three sets of teeth 36, 38, and 40 are spaced 120 degrees apart from each other in the direction 16 so that one or more tooth of one set of teeth can be aligned with the platen teeth 18 during movement of the forcer 12 relative to the platen 14. For example, the 38 teeth of the second pole pair 32 are shifted about 120 degrees (e.g., about ⅓) of the tooth pitch 24 relative to the teeth 36 of the first pole pair 30. Similarly, the teeth 40 of the third pole pair 34 are shifted about 240 degrees (e.g., about ⅔) of the tooth pitch 24 relative to the teeth 36 of the first pole pair 30.

Stated more generally, the teeth of the second pole pair 32 are offset relative to the teeth of the first pole pair 30 by about $(+/-120°+L*180°)*P/360°$, where L is a natural number and P is the predefined tooth pitch. The teeth of the third pole 34 pair are offset in relative to the set of teeth of the second pole 32 pair by about $(+/-120°+M*180°)*P/360°$, where M is a natural number. The teeth of the third pole pair are offset relative to the set of teeth of the first pole pair 30 about $(+/-240°+N*180°)*P/360°$, where N is a natural number. The natural numbers L, M and N can be the same or different.

Because of such an arrangement, with every 120 degrees of movement between the forcer 12 and the platen 14, one set of teeth 36, 38, or 40 can align with the teeth 18 of the platen.

The teeth 36, 38, and 40 of the respective pole pairs 30, 32, and 34 also have a tooth width based on the tooth pitch 24 at the platen 14. In one aspect, the tooth width at each pole pair 30, 32, 34 approximates the tooth width 24 of the platen teeth 18. The three phase motor configuration enables the platen teeth 18 and the pole teeth 36, 38, and 40 to have a relatively large tooth pitch, such as, for example, a width from about 5 mm to about 15. This facilitates manufacturing of the motor system 10, as the teeth 18, 36, 38, 40 may be formed by conventional machining techniques (e.g., cutting or grinding) and still provide a desired amount of resolution. This is in contrast to etching techniques typically employed for smaller tooth widths (e.g., about 1 mm or less) that are required to obtain comparable resolution in linear stepper motors.

Each of the pole pairs 30, 32, and 34 is formed of a respective pair of poles 42 and 44, 46 and 48, 50 and 52. In the example of FIG. 1, the poles 42 and 44, 46 and 48, 50 and 52 are elongated, generally U-shaped rigid members that extend between spaced apart side edges 54 and 56 of the forcer 12. In particular, legs of the U-shaped members extend in a substantially parallel relationship toward the platen 14 and terminate in respective pole faces (ends of the pole teeth) located adjacent to the platen 14. The distance between the pole faces and the platen teeth defines an air gap 58 for the motor system 10. The air gap 58, for example, can be maintained by a bearing support (e.g., low friction bearings or air bearings) operative to permit substantially free movement between of the forcer 12 and platen 14. The legs further define the associated teeth 36, 38, 40. The poles 42–52, for example, are formed of a ferrous material or other suitable magnetizable material.

A central channel (or slot) 60, 62, 64, 66, 68, 70 also extends longitudinally through each respective pole 42, 44, 46, 48, 50, 52. Each channel 60, 62, 64, 66, 68, 70 is dimensioned and configured to receive part of an associated coil 72, 74, 76. Each coil 72, 74, 76 includes a plurality of windings of an electrically conductive material (e.g. wire). Thus, the pole pair 30 and coil assembly 72 define phase A, the pole pair 32 and coil assembly 74 define phase B, and the pole pair 34 and coil assembly 76 define phase C of the three phase system 10.

While the example of FIG. 1 employs pre-wound coil assemblies inserted within associated slots at each pole, those skilled in the art will understand and appreciate that coils 72, 74, and 76 could be wound in situ around corresponding parts of the poles 42–52. In addition, coil configurations different from that illustrated could be utilized to form a motor system 10, in accordance with an aspect of the present invention.

In accordance with an aspect of the present invention, each pole 42, 46, 50 is magnetically coupled to its associated pole 44, 48, 52 of each respective pole pair. With particular reference to the pole pair 30, an elongated permanent magnet 80 is interposed between the poles 42 and 44. The magnet 80 extends longitudinally between the side edges 54 and 56 of the forcer 12. The magnet 80 may operatively hold the poles 42 and 44 together in a desired relationship, such as due to the magnetic field produced by the magnet. Other connecting means also could be employed to fix the poles at a desired orientation, such as illustrated in FIG. 1. The pole pairs 32 and 34 similarly include magnets 82 and 84 that magnetically couple the respective poles 46, 48 and 50, 52. Additional retaining means (e.g., glue, bolts, etc.) also could be employed to hold each pair of poles 42 and 44, 46 and 48, 50 and 52 together.

The permanent magnets facilitate the flow of magnetic flux through each pole pair. By way of illustration, when the motor system 10 is in an unexcited condition, the permanent magnet flux flows into the U-shaped structure of the pole and divides evenly between the two branches thereof. The flux traverses the air gap at the pole faces between the pole teeth and the platen. It then flows through the platen, crosses the other air gap, and divides evenly between the pole faces of the second U-shaped lamination to complete its circuit at the opposite end of the permanent magnet.

When current is established in a winding, its generated flux reinforces the permanent magnet flux at one pole face and diminishes it at the other pole face. In this manner, the permanent magnet flux can be effectively "commutated" from one pole face to the other. By varying the winding current's sign and amplitude, the flux can be partially or completely directed to either pole face.

After the respective poles have been assembled, as shown in FIG. 1, a suitable encapsulation, indicated in phantom at 88, may be applied to permanently fix the respective poles at a desired position. The encapsulation, for example, may be an epoxy or thermoplastic material.

The foregoing arrangement provides a three phase linear motor system 10 that facilitates the use of conventional control electronics. For example, the motor system 10 may employ an encoder (e.g., magnetic, optical, etc.) to monitor the relative (or absolute) position of the forcer 12 relative to the platen 14 and provide an encoder signal indicative thereof. A motor controller, such as three phase servo controller, can implement and control energization of the respective coils 72, 74, 76 based on the encoder signal to provide desired movement of the forcer 12 along the path provided by the platen 14. As a result, the motor system 10 is capable of accuracy comparable to a linear brushless AC motor, but at a reduced manufacturing cost due to the reduction in the number of permanent magnets.

FIGS. 2–7 depict movement of the linear motor system 10 in accordance with an aspect of the present invention, in which identical reference number are employed to refer to corresponding parts of the system 10 previously shown and described with respect to FIG. 1. The following figures illustrate the forcer moving in a single direction, although it is to be understood and appreciated that the motor system 10 may be employed to provide movement in any direction and direction combinations in accordance with an aspect of the present invention. The coils 72, 74 and 76 are described as being energized by respective phase currents $I_a$, $I_b$, $I_C$, which vary as a three phase signal according to a percentage of an available drive current. For example, the three phase signal can be a square wave or sinusoidal in which two of the three phases are respectively 120° and 240° out of phase relative to the other phase.

Figures 2, 3:
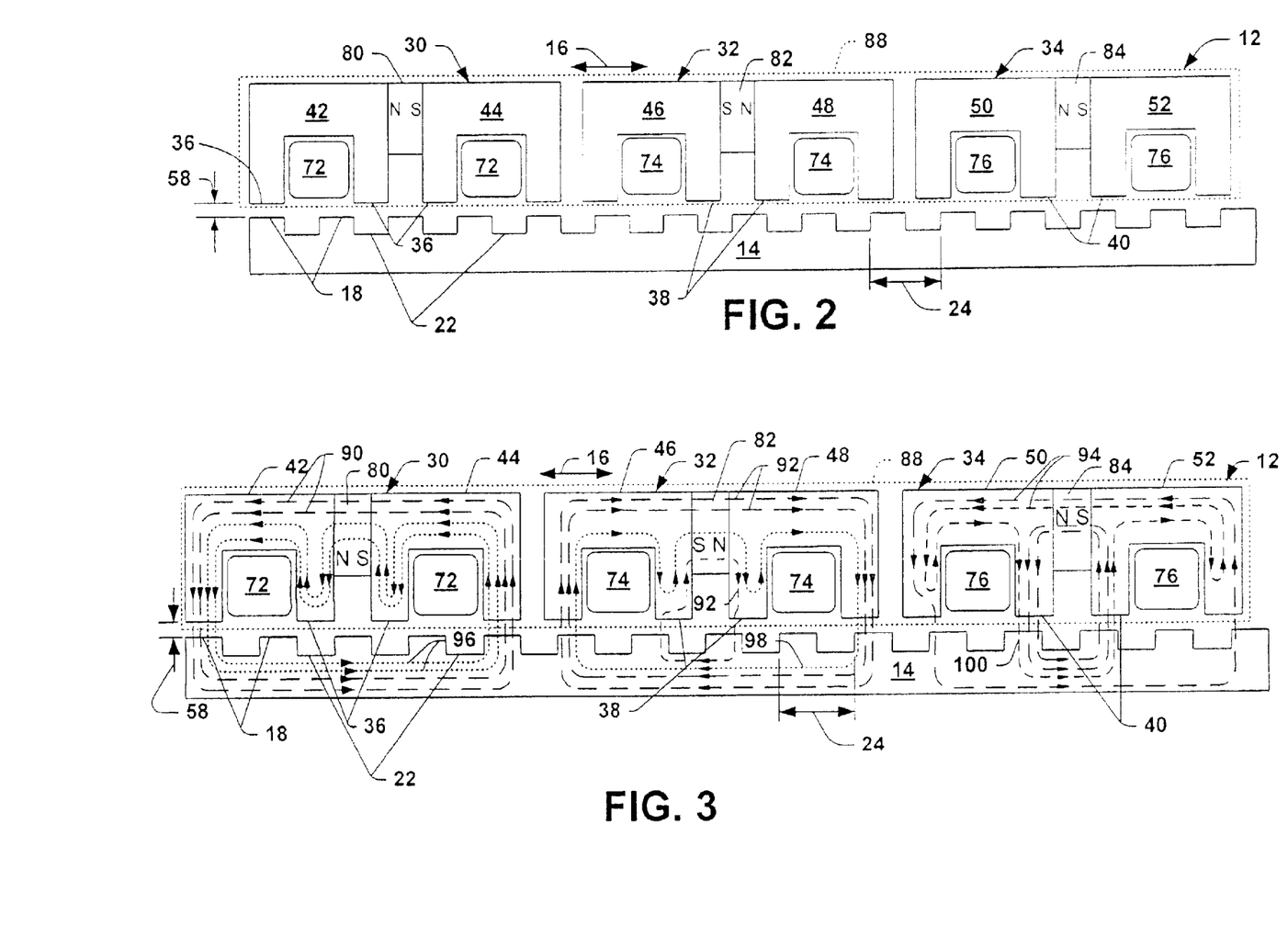
FIG. 2 is a front sectional view of a linear motor illustrating a first motor condition, in accordance with the present invention.
FIG. 3 is view of the motor of FIG. 2, illustrating magnetic flux lines through the motor in accordance with the present invention.

Turning to FIG. 2, the forcer 12 is oriented relative to the platen 14 such that teeth 36 of the poles 40 and 42 are aligned with platen teeth 18. In particular, one tooth 36 of each of the poles 42 and 44 is aligned with associated platen teeth 18 while the other teeth of the poles are aligned with valleys between platen teeth. By way of example, at such a position, the excitation current ($I_a$) through the winding 72 of phase A is at 100% of a desired drive current to provide a minimum reluctance condition at the aligned teeth. The electrical currents ($I_b$,$I_c$) through the other phases B and C, in turn are set to −50% of the drive current.

FIG. 3 illustrates a motor condition corresponding to a motor condition shown and described with respect to FIG. 2. In FIG. 3, magnetic flux lines are depicted in each of the pole pairs 30, 32, and 34 according to the relative position of the pole teeth 36, 38, and 40 and the platen teeth 18. The flux lines 90, 92, and 94 correspond to magnetic flux from the magnet through the respective pole pairs 30, 32, and 34. The flux lines 96, 98, and 100 correspond to magnetic flux due to energization of the coils through the respective pole pairs 30, 32, and 34 at the levels specified with respect to FIG. 2. The platen 14 provides a return path for flux traveling through the poles 42–52. As a result of the alignment between the teeth 36 of the pole pair 30 and the platen teeth 18, maximum magnetic flux lines 90 pass between the aligned teeth to provide corresponding normal force between the aligned teeth 36 and 18. In contrast, the teeth 36 aligned with the valleys 22 of the platen 14 are illustrated as having no magnetic flux lines 96 traveling between the forcer 12 and the platen. Instead, the magnetic flux in such legs is effectively canceled.

With respect to the pole pair 32, the magnetic flux passes through the end teeth 38 and associated platen teeth, which exhibit a level of substantial alignment (e.g., greater than about 50% alignment) therebetween. The slight alignment between the middle pole teeth 38 and platen teeth 18 defines a separate magnetic flux path for flux 92 from the magnet 82.

The pole pair 34 also includes magnetic flux paths determined according to the relative amount of alignment between its pole teeth 40 and the platen teeth 18. As illustrated in FIG. 3, the middle teeth 40 and associated platen teeth, which exhibit the location of substantial tooth alignment for the pole pair 34, provide a magnetic flux lines 100 having maximum flux for the respective poles 50 and 52. In contrast, the outermost teeth 40 of the pole pair 34, which are only slightly aligned (e.g., less than 50% alignment) with the platen teeth, provide a flux path having proportionally less magnetic flux lines 94 when compared to the flux lines 100 passing through the intermediate part of the pole pair 34.

In view of the description provided with respect to FIG. 3, those skilled in the art will understand and appreciate how the flux paths and magnetic flux lines will vary according to the relative position of the forcer and platen, as described with respect to FIGS. 4–7.

Figure 4:
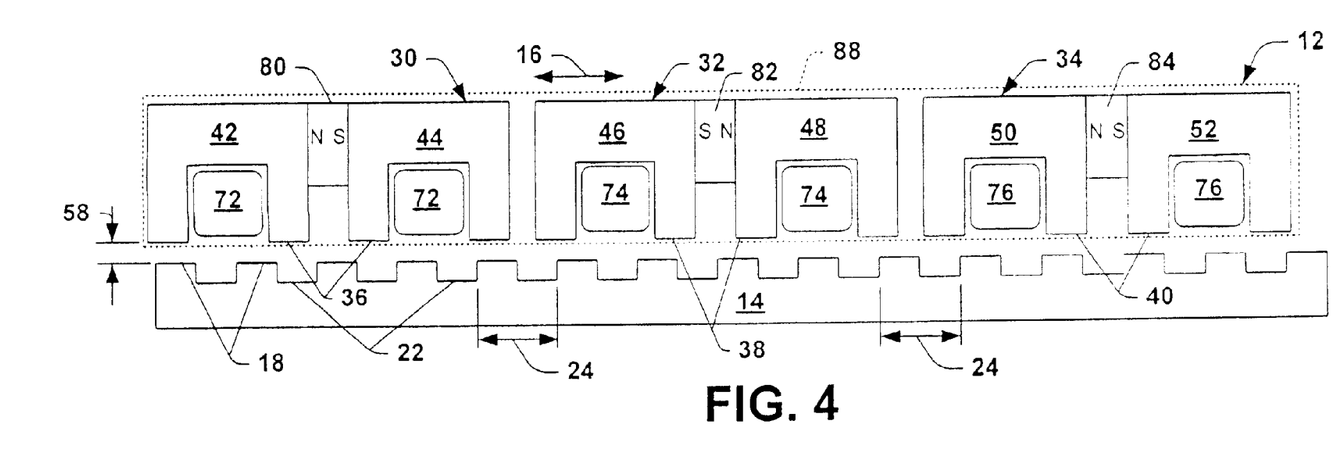
FIG. 4 is another view of the motor of FIG. 2 illustrating a second motor condition, in accordance with the present invention.

Turning to FIG. 4, the forcer 12 has moved relative to the platen, such that no pole teeth 36, 38, 40 are aligned with the platen teeth 18. Specifically, the teeth 38 of the pole pair 32 for phase B are completely misaligned with associated platen teeth 18. Accordingly, no excitation current $I_b$ flows through the coil assembly of phase B. In contrast, the electrical currents ($I_a$, $I_c$) through the coil assemblies 72 and 76 for phases A and are energized to about 86.6% and −86.6% of the drive current, respectively.

Figure 5:
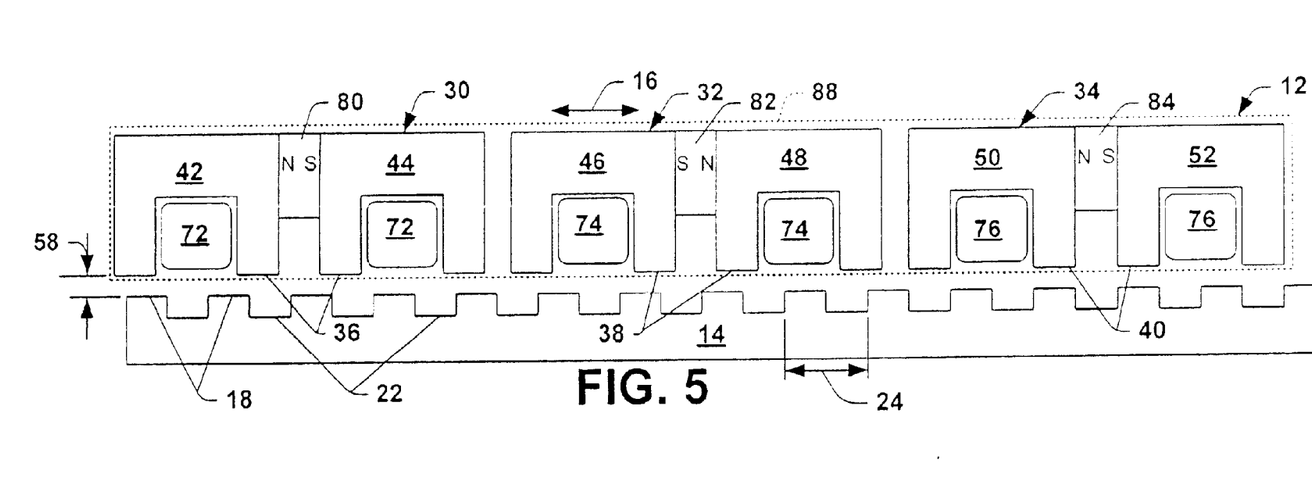
FIG. 5 is another view of the motor of FIG. 2 illustrating a third motor condition, in accordance with the present invention.

FIG. 5 corresponds to a subsequent motor condition in which teeth 40 of the pole pair 34 are aligned with the platen teeth 18. Thus, the excitation current through the coil 76 is set to −100% of the available drive current so as to achieve a minimum reluctance condition. The excitation current through the other coils 72 and 74 are set to about 50% of the available drive current.

Figure 6:
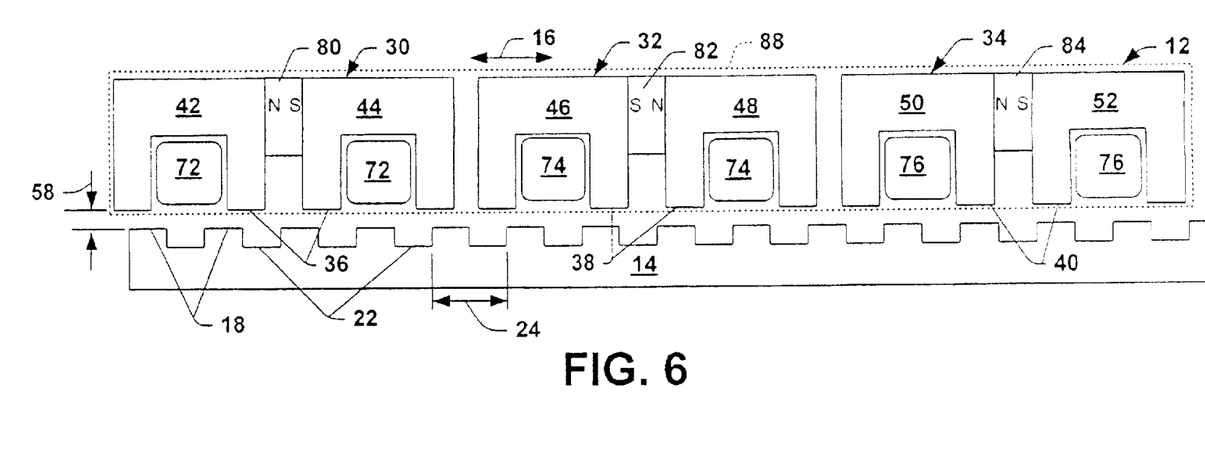
FIG. 6 is another view the motor of FIG. 2 illustrating a fourth motor condition, in accordance with the present invention.

FIG. 6 illustrates a motor condition similar to FIG. 3 in which no current is provided to the coil assembly 72 associated with phase A, due to the misalignment between the teeth 36 of the pole pair 30 and the platen teeth 18. An excitation current of about +86.6% of the drive current is provided to the coil assembly 74 of phase B and about −86.6% of the drive current to the coil assembly 76 of phase C.

Figure 7:
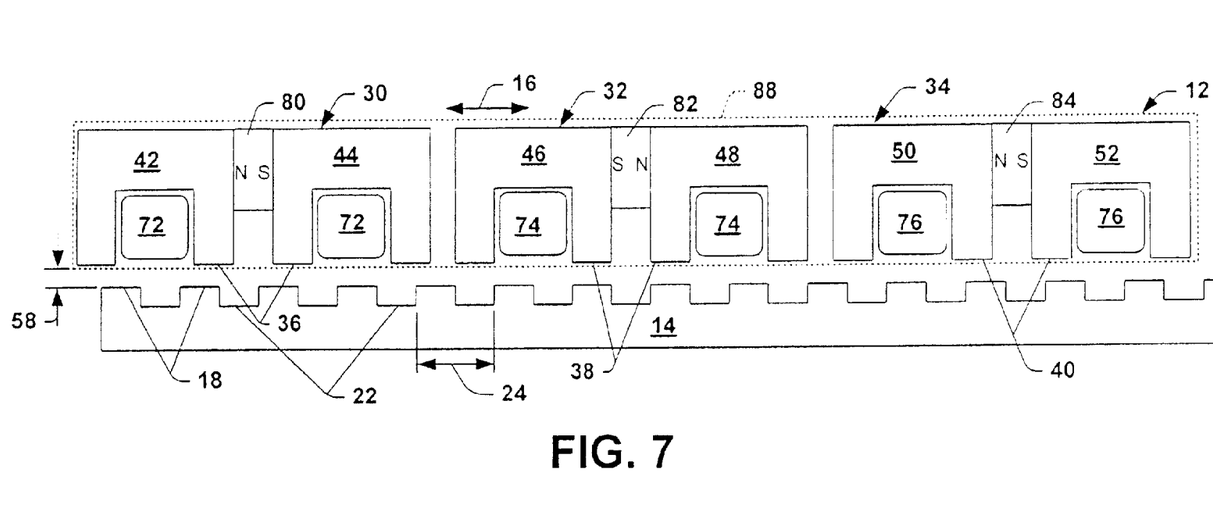
FIG. 7 is yet another view of the motor of FIG. 2 illustrating a fifth motor condition, in accordance with the present invention.

FIG. 7 shows a motor condition in which teeth 38 of phase the pole pair 32 are aligned with associated platen teeth 18. Thus, at such condition, the excitation current applied to the coil assembly 74 is at +100% of the available drive current. The alignment between the teeth 38 and 18 provides a path for maximum magnetic flux and, thus, a minimum reluctance condition. The current applied to the other coils 72 and 76 associated with phases A and C are respectively at −50% and +50% of the available drive current.

Those skilled in the art will understand and appreciate various control schemes that could be implemented with the three phase motor system 10 in accordance with an aspect of the present invention to effect desired movement of the forcer 12 relative to the platen 14.

Figure 8:
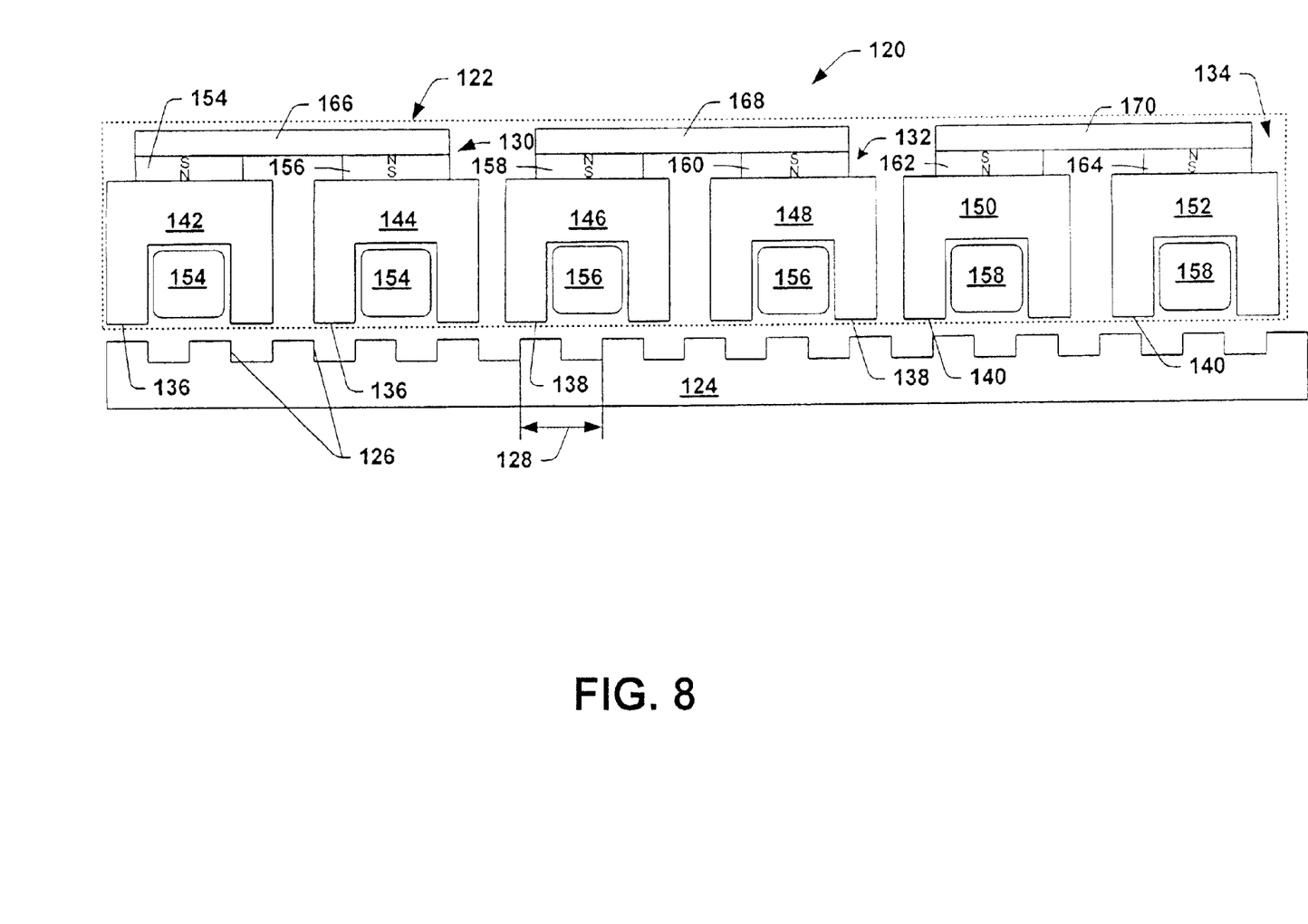
FIG. 8 is front view of another type of linear motor in accordance with the present invention.

FIG. 8 illustrates an alternative configuration for a three phase linear motor system 120 in accordance with an aspect of the present invention. In this example, the motor system includes a forcer 122 that is moveable relative to platen 124. The platen has a plurality of teeth 126 spaced apart from each other according to a defined tooth pitch 128. In accordance with an aspect of the present invention the platen teeth 126 are not permanent magnets. That is, the platen 124 is formed of an electrically conductive material (e.g., iron) that is capable of being magnetized in response to magnetic fields generated in response to energizing the forcer 122 so as to provide a return path for magnetic flux from the forcer. In accordance with an aspect of the present invention, the platen teeth 126 are not permanent magnets.

The forcer 122 includes three pole pairs 130, 132, and 134. Each pole pair 130, 132, 134 includes respective set of teeth 136, 138, 140, which are arranged as a function of the platen tooth pitch 128. In particular, each set of teeth 136, 138, 140 is offset from an adjacent set of teeth by about 120 degrees of the tooth pitch 128. In particular, the set of teeth 138 of the pole pair 132 is offset by about 120 degrees from the set of teeth 136 of the pole pair 130. The set of teeth 140 of the pole pair 134 offset 240 degrees of the tooth pitch relative to the set of teeth 136 of the pole pair 130 and offset 120 degrees of the tooth pitch relative to the set of teeth 128 of the pole pair 132. As a result, of such teeth spacing, at most one set of teeth 136, 138, or 140 can be completely aligned with platen teeth 126 at a given motor condition. hi the motor condition illustrated in FIG. 8, two teeth of the pole pair 130 are aligned with associated platen teeth 126 and the other two teeth of the pole pair 130 are aligned with valleys of between platen teeth.

In the example of FIG. 8, each of the pole pairs 130, 132, 134 further includes separate poles 142 and 144, 146 and 148, and 150 and 152, respectively. Each of the pole pairs 130, 132, and 134 further includes a coil 154, 156, and 158 disposed around part of the respective poles, such as extending through associated slots formed in each pole 142, 144, 146, 148, 150, and 152. Each coil 154, 156, 158 includes a plurality of windings that define a respective phase A, B, C of three phase motor system 120. While a single coil is illustrated as being associated with each phase, it is to be appreciated that more than one coil could be associated with each phase, such as connected in series or in parallel.

In accordance with an aspect of the present invention, the associated poles 142 and 144, 146 and 148, and 150 and 152 of each respective pole pair 130, 132, 134 are magnetically coupled to each other. In the example of FIG. 8, the magnetic couplings are implemented by an arrangement of permanent magnets 154 and 156, 158 and 160, 162 and 164 located at the distal end of each pole, which magnets are electrically connected together by a plate of an electrically conductive material (e.g., back iron) 166, 168, 170. Each magnet pair 154 and 156, 158 and 160, 162 and. 164 of each associated polepair 130, 132, 134 has an opposite polarity so that the combination of magnets and back iron provides a flux path through which magnetic flux lines can travel. While a pair of oppositely polarized permanent magnets 154 and 156, 158 and 160, 162 and 164 are illustrated at the distal ends of the associated poles, it is to be appreciated that a suitable magnetic coupling may be provided by one of the pieces being a permanent magnet and the other piece being a magnetizable material, such as iron.

Figure 9:
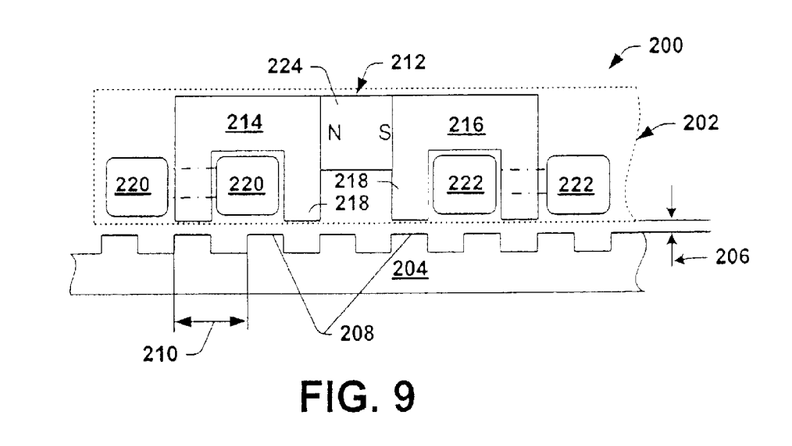
FIG. 9 is a front view of part of another linear motor arrangement in accordance with the present invention.
Figure 10:
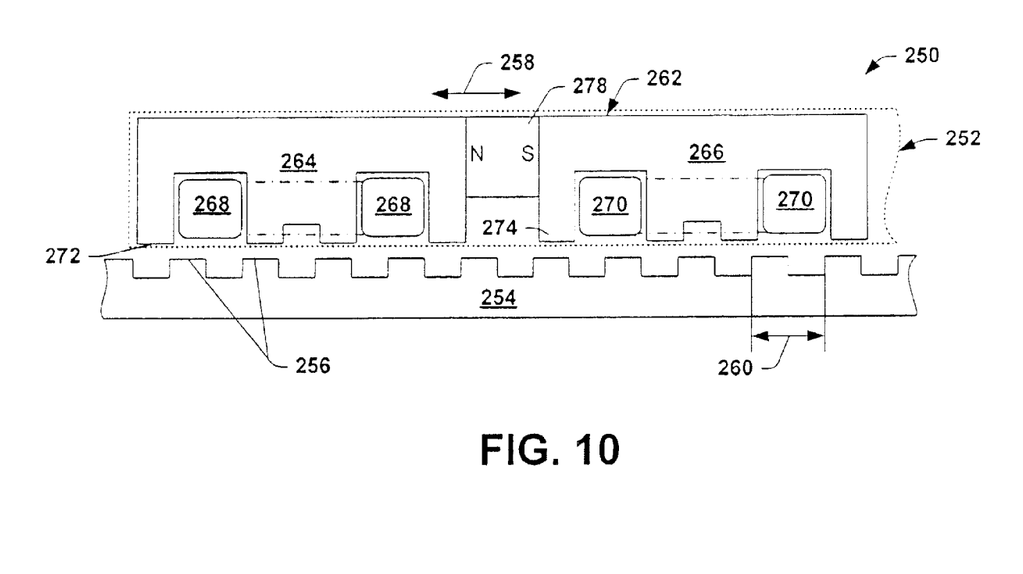
FIG. 10 is a front view of part of another linear motor arrangement in accordance with the present invention.

In view of the foregoing those skilled in the art will understand and appreciate that a three phase linear motor system, in accordance with the present invention, can embody various motor configurations similar to linear stepper motors. FIGS. 9 and 10 illustrate possible alternative motor configurations that can be implemented for a three phase linear motor system in accordance with an aspect of the present invention. For sake of brevity only a single phase of such three phase motor systems are depicted in FIGS. 9 and 10, It is to be understood and appreciated, however, that other phases of the respective three phase motor systems would be substantially identical to the illustrated phase, but be offset so that at most one set of pole teeth (of an associated phase) can align with the platen teeth at a given time.

FIG. 9 illustrates part of a motor system 200 in which part of a forcer 202 is spaced apart from a platen 204 by an air gap 206. The platen 204 includes teeth 208 separated by valleys according to a tooth pitch 210. In accordance with an aspect of the present invention, the teeth 208 do not include permanent magnets, but are selectively magnetizable in response to an electric field generated by energizing the motor system 200. The platen 204 thus provides a return path for magnetic flux traveling through the forcer 202.

The forcer 202 includes three pole pairs, including the illustrated pole pair 212 that includes two magnetically coupled poles 214 and 216. In this example each pole 214, 216 is illustrated as a generally U-shaped element having legs that define teeth 218 of the respective poles. The pole teeth 218 have a width that is substantially the same as the width of the platen teeth 208 and have a tooth pitch that approximates an integer multiple of the tooth pitch 210. As a result, when some of the pole teeth 218 are aligned with platen teeth 208, the other pole teeth of that pole are aligned with valleys of the platen.

In the example of FIG. 9 each pole 214, 216 includes a separate coil 220, 222 associated therewith. The coils 220 and 222 may be connected in series or in parallel to define a phase of the three phase linear motor in accordance with an aspect of the present invention. In addition, the poles 214 and 216 are magnetically coupled. By way of illustration, the poles 214 and 216 are magnetically coupled by a permanent magnet 224 interposed between adjacent side edges of the poles, which permanent magnet has a width equal to the tooth pitch 210. The permanent magnet 224 provides a flux path for magnetic flux lines to travel between poles, including when the associated phase coils 220 and 222 are energized. Alternatively, the poles could be magnetically coupled by a magnet and back iron arrangement similar to that shown and described with respect to FIG. 8.

Those skilled in the art will understand and appreciate that the other two pole pairs (not shown for sake of brevity) of the three phase linear motor system 200 will be similarly configured with the pole pair 212, but offset from the pole pair 212 by +/−120 degrees of the tooth pitch 210 and by +/−240 degrees of the tooth pitch, respectively. As a result of such motor configuration, the teeth of at most one of the pole pairs will be aligned with the platen teeth. By such configuration, the motor system 200 also is well suited to be controlled by a standard three phase servo motor controller.

FIG. 10 illustrates yet another example of a three phase linear motor system 250 in accordance with an aspect of the present invention. The motor system 250 includes a platen 252 that provides a path over which one or more forcers 254 may travel. The platen 252 includes a plurality of teeth 256 that extend in a substantially parallel manner from a planar surface of the platen. The teeth 256 are spaced apart from each other in a direction of movement 258 by valleys to provide a defined tooth pitch 260. In accordance with an aspect of the present invention, the teeth 256 are not permanent magnets, but are formed of a magnetizable material. Thus, the platen 252 provides a return path for magnet flux generated at the forcer 254.

The forcer 252 includes three pole pairs, one of which, indicated at 262, is depicted in FIG. 10. The pole pair 262 includes a pair of poles 264 and 266. In the illustrated example, each pole 264, 266 includes a pair of slots dimensioned and configured to receive a respective coil 268, 270. The coils 268 and 270 may be pre-wound assemblies or be wound in situ around the respective pole pieces, as is known in the art. The coils 268 and 270 are electrically connected to each other, such as in series or parallel, to provide a common phase of the three phase linear motor system 250. Each of the pole 264, 266 further includes four respective teeth 272, 274 that extend toward the platen 254 in an opposing relationship relative to the platen teeth 256. The teeth 272 and 274 have a width (in the direction of movement 258) that is substantially identical to the tooth width of the platen teeth and are arranged to approximate the tooth pitch 260 at the platen.

The platen teeth 256 and pole teeth 272 and 274, for example, can have a width from about 5 mm to about 15 mm. This facilitates manufacturing of the motor system according to the present invention, as the teeth may be formed by machining (e.g., cutting or grinding) in contrast to more expensive etching techniques typically employed for smaller tooth widths (e.g., 1 mm or less). Such manufacturing specifications are further enabled by implementing standard three phase servo motor controls with a positioning encoder to control operation of the motor system 250.

In accordance with another aspect of the present invention, the poles 264 and 266 are magnetically coupled. By way of illustration, the poles 264 and 266 are magnetically coupled by a permanent magnet 278 interposed between and interconnecting adjacent side edges of the poles. The magnet 278 extends a width between the poles commensurate with the platen tooth pitch. The permanent magnet 278 provides a path that facilitates the travel of magnetic flux lines between poles 264 and 266, such as when the associated phase coils 268 and 270 are energized by an excitation current. Alternatively, the poles 264 and 266 could be magnetically coupled by a magnet and back iron arrangement similar to that shown and described with respect to FIG. 8.

The other pole pairs of the three phase motor system 250 are configured substantially identically to the pole pair 262. However, the teeth of the other pole pairs are offset in a direction of movement 258 relative to the set of teeth 272, 274 of the pole pair 262 by +/−120 degrees and +/−240 degrees of the platen tooth pitch 260, respectively. In this way, at most, one set of pole teeth can be aligned with the platen teeth 256 at a given time. The motor system 250, similar to the other arrangements shown and described herein, can be controlled by a standard three phase servo motor controller. By employing a three phase motor controller, the tooth width may be provided at a dimension that is easily machined (e.g., ranging from about 5 mm to about 15 mm). Reducing the number of permanent magnets also reduces manufacturing costs, as the platen teeth 256 are not permanent magnets, as is typical in three phase linear motors.

Figure 11:
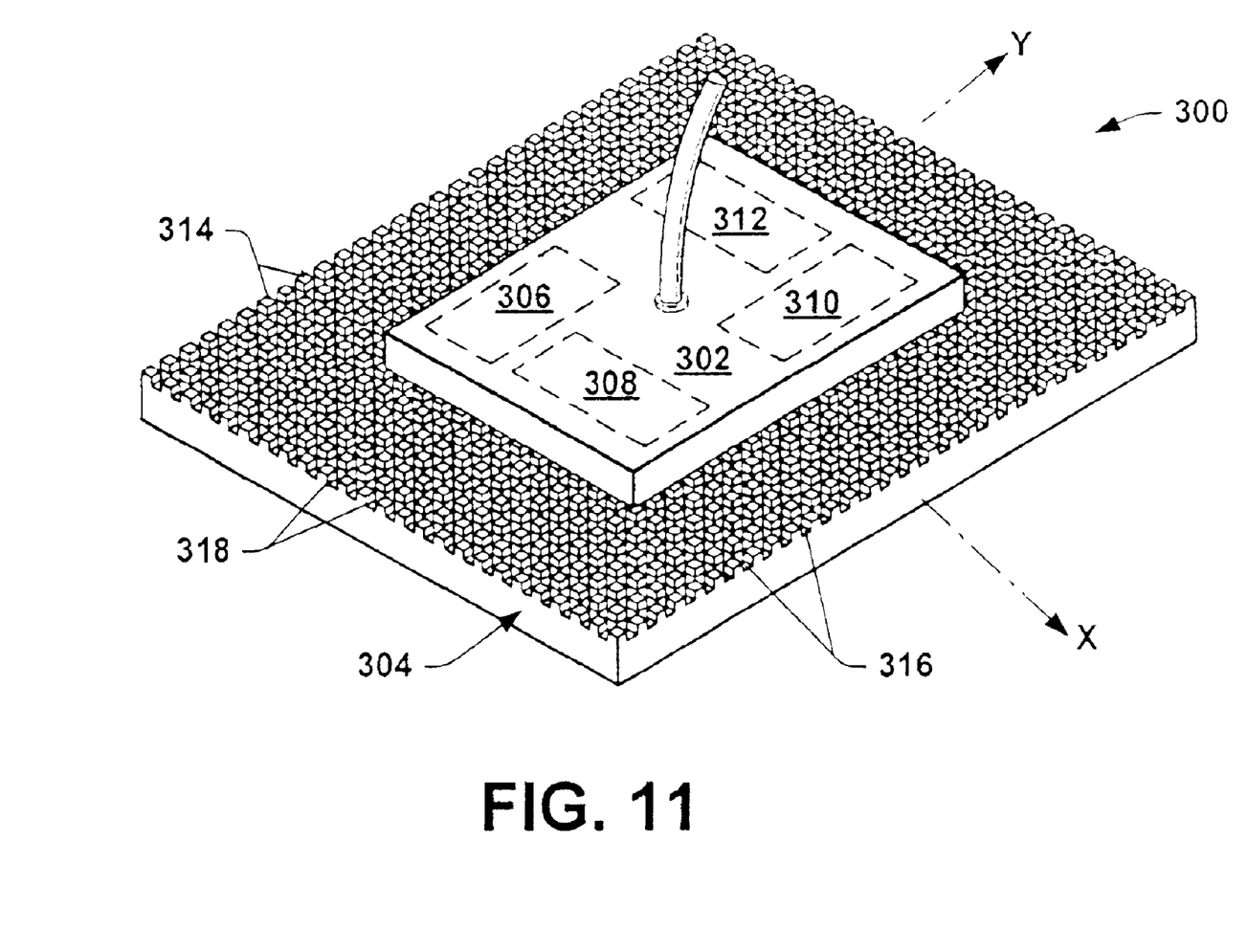
FIG. 11 is an isometric view of a two-dimensional motor system in accordance with the present invention.

While the foregoing examples have shown and described three phase linear motors, in accordance with the present invention, that travel in a single dimension, those skilled in the art will understand and appreciate that the principles contained herein may be extended to two-dimensional. FIG. 11 illustrates an example of a two-dimensional linear motor system 300, which may be implemented in accordance with the present invention. The motor system 300 includes a stage 302 that is moveable in both the X and Y directions relative to a platen 304. The stage 302 is illustrated as having four three phase forcers 306, 308, 310, and 312, although any number of forcers for each direction could be employed in accordance with the present invention. Two of the forcers 306 and 310 are oriented to move the stage in the Y-direction when energized and the other forcers 308 and 312 are operative to urge the stage in the X-direction when energized. Each of the forcers 306, 308, 310, and 312 is configured as a three phase linear motor in accordance with an aspect of the present invention (See, e.g., FIGS. 1–10).

While the platen 304 is illustrated as being generally flat, it will be understood and appreciated by those skilled in the art that the platen could be curved or have a generally tubular configuration. In addition, the coil and magnet assembly could be stationary and the platen could be the moving member.

The platen 304 includes a plurality of spaced apart teeth 314 having a generally square cross section that protrude from a planar surface of the platen. The teeth are separated by grooves 316 and 318 extending in the X and Y directions. According to an aspect of the present invention, the platen teeth 314 are not permanent magnets, but instead are selectively magnetizable according to the electric fields generated in the stage (or stages) 302 traveling thereon. That is, the platen teeth 314 are formed of a material having a desired relatively high magnetic permeability, such as iron, so that the teeth and platen base from which they extend are easily magnetizable in response fields imposed from the forcers 306, 308, 310, and 312.

As a result, the teeth 314 and grooves 316 and 318 cooperate with the electromagnet field generating mechanisms in the stage 302 (e.g., the forcers 306, 308, 310, and 312) to selectively move the stage in the X and/or Y directions. As described above, each of the forcers 306, 308, 310, and 312 is well suited for control by a standard three phase servo motor controller. In order to provide suitable position encoding to implement the servo motor controls, a glass scale or optical encoding scheme may be employed to provide desired closed loop position feedback. Because the teeth are not formed of permanent magnets, manufacturing costs can be significantly reduced when compared relative to existing three phase linear motor systems. Manufacturing is further facilitated because the three phase controls enable generally larger tooth sizes to be implemented in accordance with an aspect of the present invention. Accordingly, more expensive chemical etching of platen teeth is not required to provide a desired high resolution linear motor system in accordance with the present invention.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A motor system, comprising:
   a forcer that induces an electromagnetic field in a platen, to move the forcer and the platen relative to each other; the forcer with a plurality of set of teeth, each set associated with a pole pair;
   the platen with a plurality of spaced apart platen teeth spread in a direction of the relative motion between the platen and the forcer, and
   a first set of teeth of the forcer is offset from a second set of teeth of the forcer by about $(+/-120°+L*180°)*P/360°$, where L is a natural number and P is a tooth pitch of the platen teeth.

2. The motor system of claim 1, the platen spaced apart from the forcer via non-friction bearings, the platen devoid of a permanent magnet or electromagnet.

3. The motor system of claim 1, the forcer comprising at least one pole pair with two poles magnetically coupled to each other.

4. The motor system of claim 3, the motor system with a multiphase alternating current operation, and the forcer comprising three pole pairs each having a set of teeth spaced such that at any given phase of the motor a maximum one set of teeth completely aligns with the platen teeth.

5. The motor system of claim 4, each pole pair comprising a coil partially positioned in a section defined via an elongated channel extending between opposite sides of each pole pair.

6. The motor system of claim 5, further comprising a third set of teeth of the forcer being offset from the first set of teeth of the forcer by about $(+/-240°+M*180°)*P/360°$, where M is a natural number and P is the tooth pitch of the platen teeth.

7. The motor system of claim 3, the at least one pole pair comprising a permanent magnet.

8. The motor system of claim 5, the platen teeth selectively magnetized via the coil.

9. The motor system of claim 4, the set of teeth associated with the forcer separated from the platen teeth via an air gap.

10. The motor system of claim 4, the teeth associated with the forcer spaced along a relative direction of the travel between the forcer and the platen, to provide a return path for magnetic flux induced into the platen.

11. The motor system of claim 4, a width for a tooth being substantially identical in the three pole pairs.

12. The motor system of claim 11, the width larger than 3 mm.

13. The motor system of claim 7, the permanent magnet interposed between two poles to create a magnetic connection therebetween.

14. The motor system of claim 1, the platen teeth formed of a generally non-permanent magnetic material.

15. The motor system of claim 13 further comprising, an electrically conductive plate interconnecting the permanent magnet with a pole.

16. A method of moving a forcer relative to a platen comprising:
   inducing an electromagnetic field via a magnetic component of a forcer into a platen; the forcer with a plurality of set of teeth, each set associated with a pole pair, a first set of teeth of the forcer is offset from a second set of teeth of the forcer by about $(+/-120°+L*180°)*P/360°$, where L is a natural number and P is a tooth pitch of the platen teeth, and
   moving the forcer and the platen relative to each other via the electromagnetic field.

17. The method of claim 16, further providing a third set of teeth as part of the forcer that is offset from the first set of teeth of the forcer by about $(+/-240°+M*180°)*P/360°$, where M is a natural number and P is the tooth pitch of the platen teeth.

18. The method of claim 16 further comprising, moving the forcer in a plane parallel to the platen.

19. A motor comprising:
   means for inducing an electromagnetic field from a forcer having a plurality of set of teeth, into a platen; each set associated with a pole pair, a first set of teeth of the forcer is offset from a second set of the forcer by about $(+/-120°+L*180°)*P/360°$, where L is a natural number and P is a tooth pitch of the platen teeth, and
   means for moving the forcer and the platen relative to each other via the electromagnetic field.

* * * * *